United States Patent Office 3,046,306
Patented July 24, 1962

---

3,046,306
PROCESS OF PREPARING TRIIODINATED ANALOGS OF THYRONINE
Robert I. Meltzer, Rockaway, Robert J. Stanaback, Bernardsville, and Wilson B. Lutz, Madison, N.J., assignors to Warner-Lambert Pharmaceutical Company, Morris Plains, N.J., a corporation of Delaware
No Drawing. Filed June 24, 1959, Ser. No. 822,431
6 Claims. (Cl. 260—519)

This invention relates to a new and novel method of preparing triiodinated analogs of thyronine of the formula:

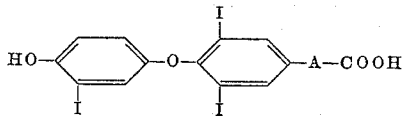

where A is selected from the group consisting of a direct linkage, an alkylene group containing 1 to 3 carbon atoms and a mono-amino substituted alkylene group containing 1 to 3 carbon atoms in the alkylene chain.

The method of the present invention is well adapted to the preparation of 3,5,3'-triiodothyronine:

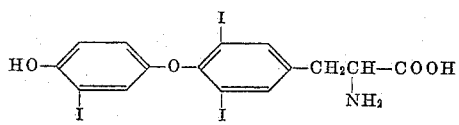

and the desamino analogs of 3,5,3'-triiodothyronine including 3,5,3'-triiodothyroaliphatic acids of the above formula where A is an alkylene group containing 1 to 3 carbon atoms. The term alkylene group as used throughout the specification and claims embraces both straight chain and branched chain groups.

There has been considerable interest in recent years in thyroxine which is the hormone of the thyroid gland, and in various derivatives and analogs of thyroxine. For example, 3,5,3'-L-triiodothyronine has been found to have a considerably higher biological activity than thyroxine and this compound has been extensively studied as a substitute for thyroxine for use in the treatment of various thyroid deficiencies.

3,5,3'-triiodothyroaliphatic acids such as 3,5,3'-triiodothyroformic, -acetic and -propionic acids are essentially inactive in terms of classical thyroxine-like activity. However, these compounds have been found to have interesting properties in that they have the ability to reduce blood serum chloesterol levels in human subjects without appreciable influence on the basal metabolic rate. The copending application of Robert L. Kroc, Serial No. 770,611, filed October 30, 1958, describes the use of 3,5,3'-triiodothyropropionic acid in the reduction of blood serum cholesterol in humans.

The methods heretofore known for the production of 3,5,3'-triiodothyronine and its analogs including 3,5,3'-triiodothyroaliphatic acids have involved, first, the preparation of 3,5-diiodothyronine or its corresponding analog followed by iodination to the desired 3,5,3'-triiodinated compound. These methods are complex and involve many individual reaction and purification steps and are accordingly generally unsatisfactory for commercial operation. Examples of prior art syntheses include the synthesis of 3,5-diiodothyronine as described by Borrows et al. in the Journal of the Chemical Society (London), pages S185 to S204 (1949), and by Harington et al. in Biochemical Journal, 21, 169 (1927), which also describes the preparation of 3,5-diiodothyroformic acid. Harington et al. in the Biochemical Journal 50, 438 (1952), describe the synthesis of 3,5-diiodothyroacetic acid, and Clayton et al. in the Journal of the Chemical Society (London), page 2467 (1951), describe the preparation of 3,5-diiodothyropropionic acid. Another chemical synthesis of 3,5-diiodothyroaliphatic acids is described by Meltzer (the applicant herein), Journal Organic Chemistry, 22, 1577 (1957). The 3,5-diiodo compounds prepared by the methods of the prior art may all be iodinated by known techniques to produce the corresponding 3,5,3'-triiodinated compounds. In view of the great interest in 3,5,3'-triiodothyronine and its analogs, there has long been need for an efficient and comercially feasible synthesis of compounds of this type.

It is, therefore, a particular object of the present invention to provide an improved method for the production of 3,5,3'-triiodothyronine and its analogs.

Other objects of this invention will appear from the following detailed description.

It has now been discovered that compounds of the formula:

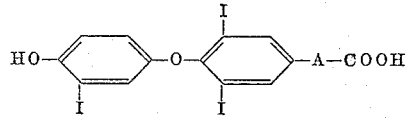

where A is a direct linkage, an alkylene group containing 1 to 3 carbon atoms or a mono-amino substituted alkylene group containing 1 to 3 carbon atoms in the alkylene chain may be prepared by reacting compounds of the formula:

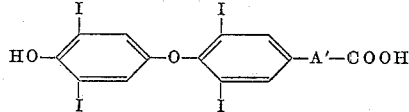

where A' is a direct linkage, an alkylene group containing 1 to 3 carbon atoms, or a mono-amino or a mono-acylamino substituted alkylene group containing 1 to 3 carbon atoms in the alkylene chain with hypophosphorous or phosphorus acid.

The starting materials which are deiodinated in accordance with this invention are 3,5,3',5'-tetraiodinated analogs of thyronine. Useful starting materials include thyroxine, 3,5-diiodo-4(4'-hydroxy-3',5'-diiodophenoxy) phenyl - β - alanine, 3,5 - diiodo - 4(4' - hydroxy - 3',5'-diiodophenoxy)phenylglycine, 3,5,3',5' - tetraiodothyro-β-aminobutyric acid and the like, N-acyl derivatives of the above listed compounds such as N-acylthyroxine and the like wherein the acyl radical includes the acyl radical of aliphatic carboxylic acids, such as acetyl, propionyl, butyryl and formyl and the acyl radical of aromatic carboxylic acids, such as benzoyl, and 3,5,3',5'-tetraiodothyroaliphatic acids as the formic, acetic, propionic, butyric, α-methylpropionic and β-methylpropionic acid analogs. The starting meterial may be added in either the free acid form or as a metal salt of the free acid. The reaction mixture is highly acidic with the result that the starting material will be present in the reaction mixture as the free acid, regardless of the particular form in which it is added initially.

In the method of the present invention the tetraiodinated starting material is deiodinated to form a 3,5,3'-triiodo analog of thyronine. When the starting material is a 3,5,3',5'-tetraiodothyroaliphatic acid, the product of the reaction is the corresponding 3,5,3'-triiodothyroaliphatic acid. When the side chain of the tetraiodinated starting material is an amino acid or an acylamino acid moiety, the product of the reaction is the corresponding 3,5,3'-triiodo analog of thyronine with an amino acid side chain, the amino group being substituted on the side chain in the product at the same point that the amino group or acylamino group is substituted on the side chain of the starting material.

It is a particular feature of the present invention that it affords a commercially feasible method of preparing 3,5,3'-triiodo analogs of thyronine. The tetraiodinated starting material may be readily obtained in accordance with known prior art procedures in relatively simple processes. For example, U.S. Patent 2,803,654 describes the production of N-acylthyroxine by the incubation of the readily available N-acyl-3,5-diiodotyrosine. The incubation may be conveniently carried out by blowing oxygen through a solution of an N-acyl-3,5-diiodotyrosine in a basic medium at a temperature of about 37 to 65° C. in the presence of a metallic catalyst. The resulting N-acylthyroxine may be directly converted to 3,5,3'-triiodothyronine or, alternately, may be hydrolized to yield thyroxine which in turn may be converted in accordance with this invention.

By procedures analogous to those described in U.S. Patent 2,803,654, other analogs of thyronine having amino acid and acylamino acid side chains may be readily obtained and the resulting tetraiodinated compounds may be used as starting materials in the method of this invention.

Matsuura et al. in the Journal of the American Chemical Society, 81, 871 (1959), describe a method for the direct synthesis of 3,5,3',5'-tetraiodothyroaliphatic acids by the incubation at a pH of about 7.5 of 4-hydroxy-3,5-diiodophenylaliphatic acids.

It is to be understood that the above references to prior art syntheses of tetraiodo analogs of thyronine are merely illustrative, and that the method of the present invention is adaptable to the preparation of triiodo analogs of thyronine, regardless of the particular method used to prepare the starting material. Of course, the optimum advantages in commercial operation will be obtained when the starting material is prepared by as efficient and economical a process as possible.

The deiodination reaction of the present invention is carried out by reacting the tetraiodinated starting material with either hypophosphorous acid or phosphorous acid. It has been found that hypophosphorous acid is a particular effective reactant for use in the method of the present invention. It is desirable for maximum yields that the reaction mixture contain at least 6 parts by weight of the hypophosphorous or phosphorous acid per part of the tetraiodinated starting material.

The reaction is most conveniently carried out by refluxing the mixture of the starting material and the hypophosphorous or phosphorous acid in a suitable solvent for the starting material. Glacial acetic acid is a particularly useful solvent for tetraiodinated analogs of thyronine, and accordingly is a preferred solvent for use in this invention.

It is also desirable that the reaction be carried out in the absence of air in order to prevent any premature oxidation of the hypophosphorous or phosphorous acid present in the reaction mixture. This condition may be obtained by insuring that the reaction vessel is filled with a blanket of an inert gas, for example, nitrogen or carbon dioxide.

It has been found that a reaction time in the range of about 20 to about 120 hours is desirable. Longer reaction times should be avoided since the over-all yield of the desired triiodinated product becomes reduced due to the formation of undesired by-products. With too short a reaction time, yields are also reduced due to insufficient conversion of the starting material.

The temperature for the deiodination reaction should preferably be within the range of about 90 to about 150° C. Lower temperatures are not economically feasible due to the necessity of excessively long reaction times. At higher temperatures, the yield is reduced due to formation of by-products.

In the method of the present invention a portion of the tetraiodinated starting material is deiodinated to form the corresponding 3,5,3'-triiodinated analog of thyronine. It is a particular feature of this invention that no significant quantities of by-products are obtained, such as the 3,5-diiodo analog of thyronine corresponding to the starting material. At the completion of the reaction the reaction mixture is processed for recovery of both the triiodinated compound produced and the unreacted tetraiodinated starting material remaining. The reaction mixture may be diluted with a large volume of water and the resulting precipitate which forms on dilution constitutes a mixture of tri- and tetraiodinated compounds which are thus recovered. Alternately, the reaction mixture may be heated under vacuum to evaporate the solvents and the residual oil neutralized with aqueous alkali, for example, sodium or potassium hydroxide, to form a precipitate which is a mixture of the tri- and tetraiodinated compounds. Where the 3,5,3'-triiodinated analog of thyronine is desired in pure form the mixture containing it in combination with unreacted starting material may be crystallized repeatedly from a solvent such as aqueous hydrochloric acid. Alternately, the mixture of tri- and tetraiodinated compounds may be thoroughly washed to free it from soluble impurities to form a purified mixture which is suitable for therapeutic use in this form.

Accordingly, the method of this invention is adapted not only to the preparation of pure 3,5,3'-triiodo analogs of thyronine but also to the preparation of mixtures of tri- and tetraiodinated analogs of thyronine, for example, a mixture of 3,5,3'-triiodothyronine and thyroxine. Such a mixture has useful therapeutic properties. 3,5,3-triiodothyronine has a potent thyroxine-like activity of relatively short duration after administration. Thyroxine, on the other hand, is slower to act but is effective for a longer period of time after administration. A mixture of 3,5,3'-triiodothyronine and thyroxine tends to approach the therapeutic properties of the active substances found in desiccated thyroid gland.

The following examples are included further to illustrate the method of the present invention:

*Example I*

A quantity of 250 mg. of sodium L-thyroxine pentahydrate is refluxed for 24 hours in an atmosphere of nitrogen with 10 ml. glacial acetic acid, and 10 ml. of 30 percent hypophosphorous acid. At the conclusion of the reaction the solvents are evaporated under vacuum, the residual oil is neutralized with sodium hydroxide and the resulting precipitate collected. After repeated recrystallizations from 2 N HCl, 35 mg. of a material having an iodine content of 55.3 percent is obtained. The calculated iodine content for 3,5,3'-triiodothyronine hydrochloride is 55.4 percent.

*Example II*

A quantity of 250 mg. of sodium L-thyroxine pentahydrate is reacted at 90° C. for 5 days with a mixture of 40 ml. glacial acetic acid and 40 ml. of 30 percent hypophosphorous acid. At the conclusion of the reaction, the reaction mixture is treated with base as described in Example I, yielding a precipitate weighing 160 mg. Analysis of this precipitate indicated that it contains 64 percent by weight thyroxine and 36 percent by weight 3,5,3'-triiodothyronine.

*Example III*

A quantity of 250 mg. of N-acetyl-L-thyroxine is refluxed in an atmosphere of nitrogen for 48 hours with a mixture of 10 ml. glacial acetic acid and 10 ml. of 30 percent hypophosphorous acid. After treatment of the reaction mixture as described in Example I, a yield of 60 mg. of product is obtained. After recrystallization from 2 N HCl, a quantity of 3,5,3'-triiodothyronine hydrochloride $[\alpha]_D^{25}$ of $-15°$ is obtained.

*Example IV*

A quantity of 250 mg. of 3,5,3',5'-tetraiodothyroacetic acid is refluxed for 28.5 hours in an atmosphere of nitrogen with 10 ml. glacial acetic acid and 10 ml. 30 percent hypophosphorous acid. After treatment of the reaction mixture with base as described in Example I a precipitate is obtained in a 75 percent yield which constitutes a mixture of 3,5,3'-triiodo and 3,5,3',5'-tetraiodothyroacetic acids.

*Example V*

A quantity of 250 mg. of 3,5,3',5'-tetraiodothyropropionic acid is refluxed for 35 hours in an atmosphere of nitrogen with 40 ml. glacial acetic acid and 10 ml. 30 percent hypophosphorous acid. After treatment of the reaction mixture with base as described in Example I, a precipitate is obtained in an 80 percent yield which constitutes a mixture of 3,5,3'-triiodo and 3,5,3',5'-tetraiodothyropropionic acids.

It is a particular feature of this invention that the reaction proceeds without the formation of significant quantities of diiodinated analogs of thyronine.

It is understood that the foregoing detailed description is given merely by way of illustration and that many variations may be made therein without departing from the spirit of our invention.

Having described our invention, what we desire to secure by Letters Patent is:

1. A method of preparing triiodinated analogs of thyronine of the formula

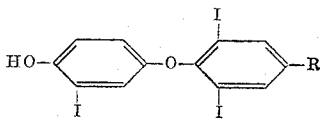

wherein R is a member selected from the group consisting of carboxyl and radicals of the formula —A—COOH where A is a member selected from the group consisting of alkylene and mono-amino substituted alkylene containing 1 to 3 carbon atoms in the alkylene chain which comprises treating tetraiodinated analogs of thyronine of the formula

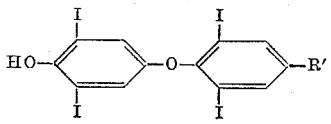

wherein R' is a member selected from the group consisting of carboxyl and radicals of the formula —A'—COOH where A' is a member selected from the group consisting of alkylene, mono-amino substituted alkylene and a carboxylic acid derived mono-acylamino substituted alkylene containing 1 to 3 carbon atoms in the alkylene chain with an acid selected from the group consisting of phosphorous acid and hypophosphorous acid at a temperature between about 90° C. and about 150° C., the ratio by weight of said acid to said tetraiodinated analog of thyronine being at least 6 to 1.

2. A method according to claim 1 wherein the reaction is carried out for about 20 to about 120 hours in the presence of glacial acetic acid.

3. A method according to claim 1 wherein said acid is hypophosphorous acid.

4. A method of preparing 3,5,3'-triiodothyroaliphatic acids of the formula:

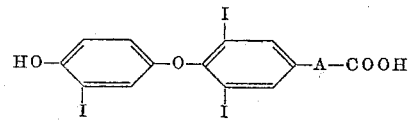

where A is an alkylene group containing 1 to 3 carbon atoms which comprise refluxing a solution of a 3,5,3',5'-tetraiodothyroaliphatic acid of the formula:

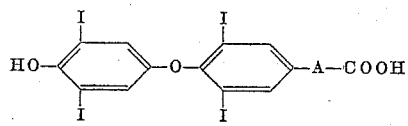

in glacial acetic acid with hypophosphorous acid, the ratio by weight of said hypophosphorous acid to said tetraiodothyroaliphatic acid being at least 6 to 1.

5. A method of preparing 3,5,3'-triiodothyronine which comprises refluxing a solution of thyroxine in glacial acetic acid with hypophosphorous acid, the ratio by weight of said hypophosphorous acid to said thyroxine being at least 6 to 1.

6. A method of preparing 3,5,3'-triiodothyronine which comprises refluxing a solution of N-acetylthyroxine in glacial acetic acid with hypophosphorous acid, the ratio by weight of said hypophosphorous acid to said N-acetylthyroxine being at least 6 to 1.

References Cited in the file of this patent

Sprott et al.: "Biochemical Journal," vol. 59 (1955), pages 288–294.